(12) United States Patent
Yang et al.

(10) Patent No.: US 11,385,956 B2
(45) Date of Patent: *Jul. 12, 2022

(54) METRIC-BASED ANOMALY DETECTION SYSTEM WITH EVOLVING MECHANISM IN LARGE-SCALE CLOUD

(71) Applicant: INTERNATIONAL BUSINESS MACHINES CORPORATION, Armonk, NY (US)

(72) Inventors: Jia Wei Yang, Hebei (CN); Fan Jing Meng, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/132,690

(22) Filed: Dec. 23, 2020

(65) Prior Publication Data

US 2021/0117259 A1    Apr. 22, 2021

Related U.S. Application Data

(63) Continuation of application No. 16/181,810, filed on Nov. 6, 2018, now Pat. No. 10,949,283.

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0709* (2013.01); *G06F 11/0751* (2013.01);
(Continued)

(58) Field of Classification Search
CPC ............. G06F 11/0709; G06F 11/0751; G06F 11/0769; G06F 11/079; G06F 11/3452;
(Continued)

(56) References Cited

U.S. PATENT DOCUMENTS

| 7,937,269 B2 * | 5/2011 | Aggarwal ............. G10L 15/063 704/245 |
| 8,688,620 B2 | 4/2014 | Viswanathan et al. |

(Continued)

OTHER PUBLICATIONS

Cao, Feng et al., Density-Based Clustering over an Evolving Data Stream with Noise, no date available, SIAM (Year: 0000).*

(Continued)

*Primary Examiner* — Marc Duncan
(74) *Attorney, Agent, or Firm* — Tutunjian & Bitetto, P.C.; Joseph Petrokaitis

(57) ABSTRACT

A computer-implemented method is presented for detecting anomalies in dynamic datasets generated in a cloud computing environment. The method includes monitoring a plurality of cloud servers receiving a plurality of data points, employing a two-level clustering training module to generate micro-clusters from the plurality of data points, each of the micro-clusters representing a set of original data from the plurality of data points, employing a detecting module to detect normal data points, abnormal data points, and unknown data points from the plurality of data points via a detection model, employing an evolving module using a different evolving mechanism for each of the normal, abnormal, and unknown data points to evolve the detection model, and generating a system report displayed on a user interface, the system report summarizing the micro-cluster information.

20 Claims, 8 Drawing Sheets

(51) Int. Cl.
*G06N 5/02* (2006.01)
*G06F 16/28* (2019.01)

(52) U.S. Cl.
CPC ........ *G06F 11/0769* (2013.01); *G06F 16/285* (2019.01); *G06N 5/02* (2013.01)

(58) Field of Classification Search
CPC .. G06F 11/3447; G06F 17/153; G06F 17/175; G06F 17/18; G06F 11/2257; G06F 11/2263; G06N 5/02
See application file for complete search history.

(56) References Cited

U.S. PATENT DOCUMENTS

| | | | |
|---|---|---|---|
| 8,868,474 B2 | 10/2014 | Leung et al. | |
| 9,355,007 B1 | 5/2016 | Eicher | |
| 9,465,857 B1 | 10/2016 | DeLand et al. | |
| 9,589,045 B2* | 3/2017 | Levitan | G06F 16/9027 |
| 10,740,656 B2* | 8/2020 | Arora | G06N 20/00 |
| 10,949,283 B2* | 3/2021 | Yang | G06N 20/00 |
| 2013/0085715 A1 | 4/2013 | Lakshminarayan et al. | |

OTHER PUBLICATIONS

Aggarwal, Charu C. et al., A Framework for On-Demand Classification of Evolving Data Streams, 2006, IEEE (Year: 2006).*

Hyde, Richard et al., Fully online clustering of evolving data streams into arbitrarily shaped clusters, Elsevier Inc., 2016 (Year: 2016).*

Meng et al., "DriftInsight: Detecting Anamalous Behaviors in Large-scale Cloud Platform", 2017 IEEE 10th International Conference on Cloud Computing. Jun. 24, 2017. pp. 230-237.

Sauvanaud et al., "Data Stream Clustering for Online Anomaly Detection in Cloud Applications", 11th European Dependable Computing Conference. Sep. 7, 2015. pp. 1-13.

Yin et al., "Anomaly detection model based on data stream clustering", Cluster Computing. DOI 10.1007/s10586-017-1066-2. Aug. 1, 2017. pp. 1-10.

List of IBM Patents or Patent Applications Treated as Related dated Dec. 23, 2020, 2 pages.

* cited by examiner

METRIC-BASED ANOMALY DETECTION SYSTEM WITH EVOLVING MECHANISM IN LARGE-SCALE CLOUD

BACKGROUND

Technical Field

The present invention relates generally to system monitoring, and more specifically, to a metric-based anomaly detection system with an evolving mechanism in a large-scale cloud.

Description of the Related Art

As information technology infrastructure becomes more complex and more dynamic, there can be numerous signals and/or metrics produced by the various different types of system monitors that monitor these complex large-scale cloud or distributed systems. The large number of signals and/or metrics can contribute to the difficulty in identifying anomalies in the complex large-scale cloud or distributed systems.

SUMMARY

In accordance with an embodiment, a method is provided for detecting anomalies in dynamic datasets generated in a cloud computing environment. The method includes monitoring a plurality of cloud servers receiving a plurality of data points, employing a two-level clustering training module to generate micro-clusters from the plurality of data points, each of the micro-clusters representing a set of original data from the plurality of data points, employing a detecting module to detect normal data points, abnormal data points, and unknown data points from the plurality of data points via a detection model, employing an evolving module using a different evolving mechanism for each of the normal, abnormal, and unknown data points to evolve the detection model, and generating a system report displayed on a user interface, the system report summarizing the micro-cluster information.

In accordance with another embodiment, a system is provided for detecting anomalies in dynamic datasets generated in a cloud computing environment. The system includes a plurality of data points received from a plurality of cloud servers, a two-level clustering training module employed to generate micro-clusters from the plurality of data points, each of the micro-clusters representing a set of original data from the plurality of data points, a detecting module employed to detect normal data points, abnormal data points, and unknown data points from the plurality of data points via a detection model, an evolving module employed to use a different evolving mechanism for each of the normal, abnormal, and unknown data points to evolve the detection model, and a system report generated to be displayed on a user interface, the system report summarizing the micro-cluster information.

In accordance with yet another embodiment, a non-transitory computer-readable storage medium comprising a computer-readable program for detecting anomalies in dynamic datasets generated in a cloud computing environment is presented. The non-transitory computer-readable storage medium performs the steps of monitoring a plurality of cloud servers receiving a plurality of data points, employing a two-level clustering training module to generate micro-clusters from the plurality of data points, each of the micro-clusters representing a set of original data from the plurality of data points, employing a detecting module to detect normal data points, abnormal data points, and unknown data points from the plurality of data points via a detection model, employing an evolving module using a different evolving mechanism for each of the normal, abnormal, and unknown data points to evolve the detection model, and generating a system report displayed on a user interface, the system report summarizing the micro-cluster information.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein.

Throughout the drawings, same or similar reference numerals represent the same or similar elements.

DETAILED DESCRIPTION

Figure 1:
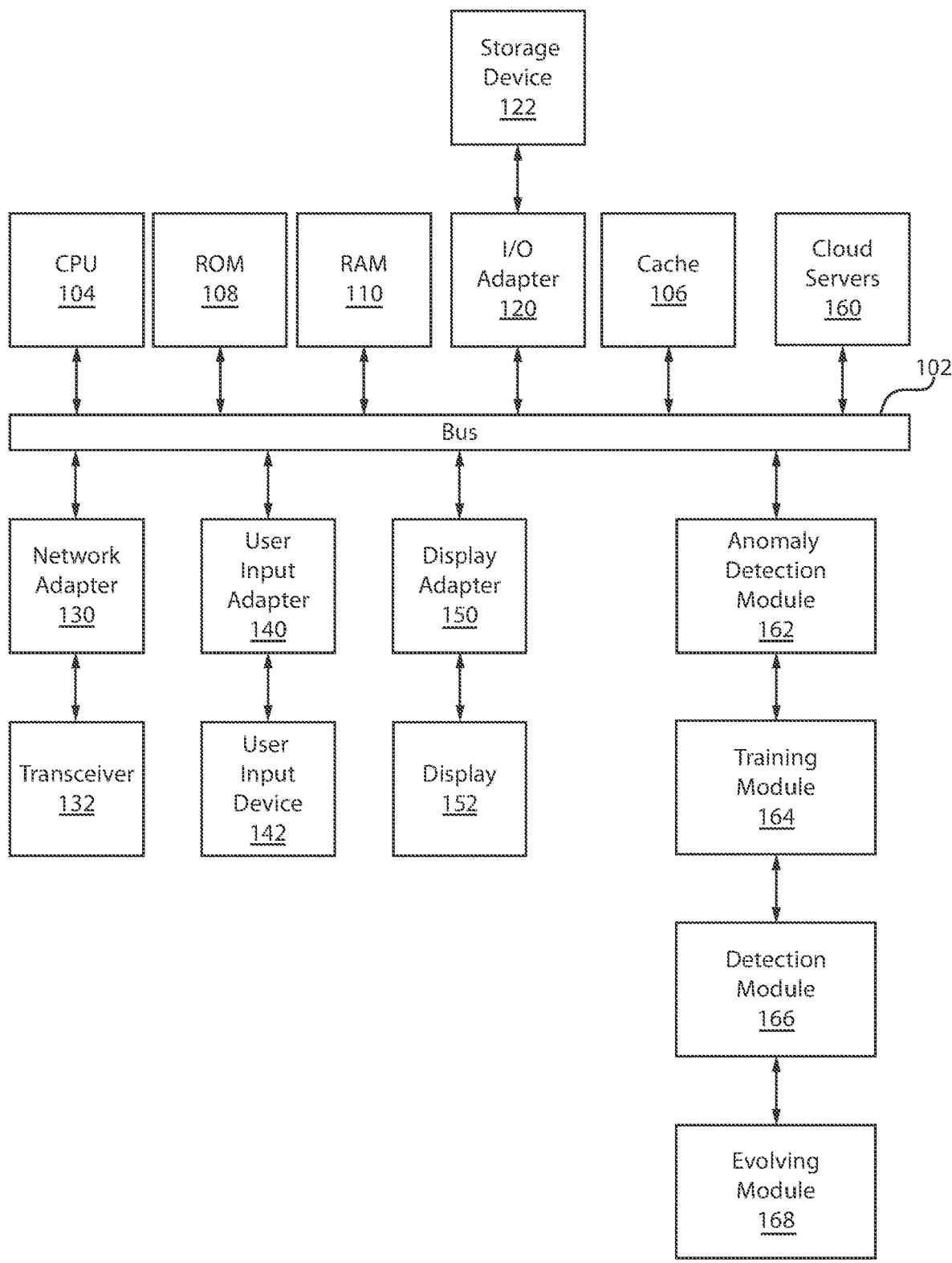
FIG. 1 is an exemplary processing system for a metric-based anomaly detection system, in accordance with embodiments of the present invention.

Embodiments in accordance with the present invention provide methods and devices for implementing anomaly detection in dynamic evolving data by utilizing a two-level clustering module to generate micro-clusters, a detection module to detect abnormal data points by employing the generated micro-clusters, and a micro-cluster evolving module employing different evolving mechanisms for each micro-cluster.

In an increasingly data-driven world where data comes in different forms (e.g., structured, unstructured), is received from various sources (e.g., consumer product and service reviews and social network communications), is associated with specific geographical locations, and is representative of different types of services (e.g., travel, healthcare, and food & drink, etc.), a user is presented with many challenges when attempting to leverage such heterogeneous and multi-dimensional data to achieve and maintain high data quality. These challenges are compounded when the leveraged data is received as streaming data that evolves continuously over time.

Traditional machine learning approaches for modeling multi-dimensional, dynamically evolving data are inefficient and expensive operations that do not efficiently scale because these approaches require responding to each change in the data by developing a new model. Usually, operations involved in developing a new model include constructing labeled data instances representing each change in the data, creating new training data sets that include the labeled instances, and adapting a new model based on the new training data sets.

Cluster analysis is a statistical analysis technique for modeling data. In cluster analysis, each of a set of objects is described using feature data, and the set of objects are grouped (i.e., clustered) so that, based on one or more aspects of the feature data, objects within a cluster are more similar to each other in terms of the feature data than they are to objects outside of the cluster. There are a variety of clustering algorithms that can be used to model data by creating a set of clusters based on aspects of the data. One type of clustering algorithm is a k-means algorithm, in which an object is assigned to a cluster determined to be nearest to the object based on comparing the Euclidean distances along one or more data dimensions between the data representing the object and the data representing the cluster.

The sizes, shapes, and total number of clusters that can be created from a particular data cloud using a clustering algorithm are dependent on the distribution of data within the data cloud. Thus, traditional clustering techniques do not adapt to dynamically evolving, multi-dimensional data because the distribution continuously varies as the data evolves and the rate and type of data changes can differ along different dimensions. Additionally, a conventional cluster data model developed for a particular data cloud cannot be used for data mining to discover clusters based on new data collected from a data stream within different timeframes and/or discover new clusters based on different data dimensions from the dimensions used for the cluster model.

Moreover, it is often beneficial for the computing resource provider to be able to identify abnormalities and failures that occur at a large scale in a fleet of servers, storage devices and equipment. For example, a computing resource provider can seek to identify hosts, whether virtual or physical, that perform abnormally or fail due to a hardware or software deployment. Such abnormalities or failures are difficult to detect with conventional clustering algorithms, such as a k-means algorithm.

Embodiments in accordance with the present invention provide methods and devices for handling abnormalities or failures detected in evolving data by dividing clustering results into three categories, that is, normal points, abnormal points, and unknown points, and employing micro-clusters to accelerate calculations. Normal and abnormal points are evolved into the model and unknown points are temporarily saved in a memory to determine whether such unknown points are noisy points. After the generation of micro-clusters, the micro-clusters are clustered into clusters that can represent which state those points are in. The system architecture includes a training module, a detection module, and an evolving module to detect anomalies in large-scale clouds.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

FIG. 1 is an exemplary processing system for a metric-based anomaly detection system, in accordance with embodiments of the present invention.

The processing system includes at least one processor (CPU) 104 operatively coupled to other components via a system bus 102. A cache 106, a Read Only Memory (ROM) 108, a Random Access Memory (RAM) 110, an input/output (I/O) adapter 120, a network adapter 130, a user interface adapter 140, and a display adapter 150, are operatively coupled to the system bus 102. Additionally, cloud servers 160 can communicate through the system bus 102. Moreover, an anomaly detection module 162 can be connected to the system bus 102, the anomaly detection module 162 employing a training module 164, a detection module 166, and an evolving module 168 for generating and processing micro-clusters.

A storage device 122 is operatively coupled to system bus 102 by the I/O adapter 120. The storage device 122 can be any of a disk storage device (e.g., a magnetic or optical disk storage device), a solid state magnetic device, and so forth.

A transceiver 132 is operatively coupled to system bus 102 by network adapter 130.

User input devices 142 are operatively coupled to system bus 102 by user interface adapter 140. The user input devices 142 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 142 can be the same type of user input device or different types of user input devices. The user input devices 142 are used to input and output information to and from the processing system.

A display device 152 is operatively coupled to system bus 102 by display adapter 150.

Of course, the processing system for a metric-based anomaly detection system can also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system for a metric-based anomaly detection system are readily contemplated by one of ordinary skill in the art given the teachings of the present invention provided herein.

Figure 2:
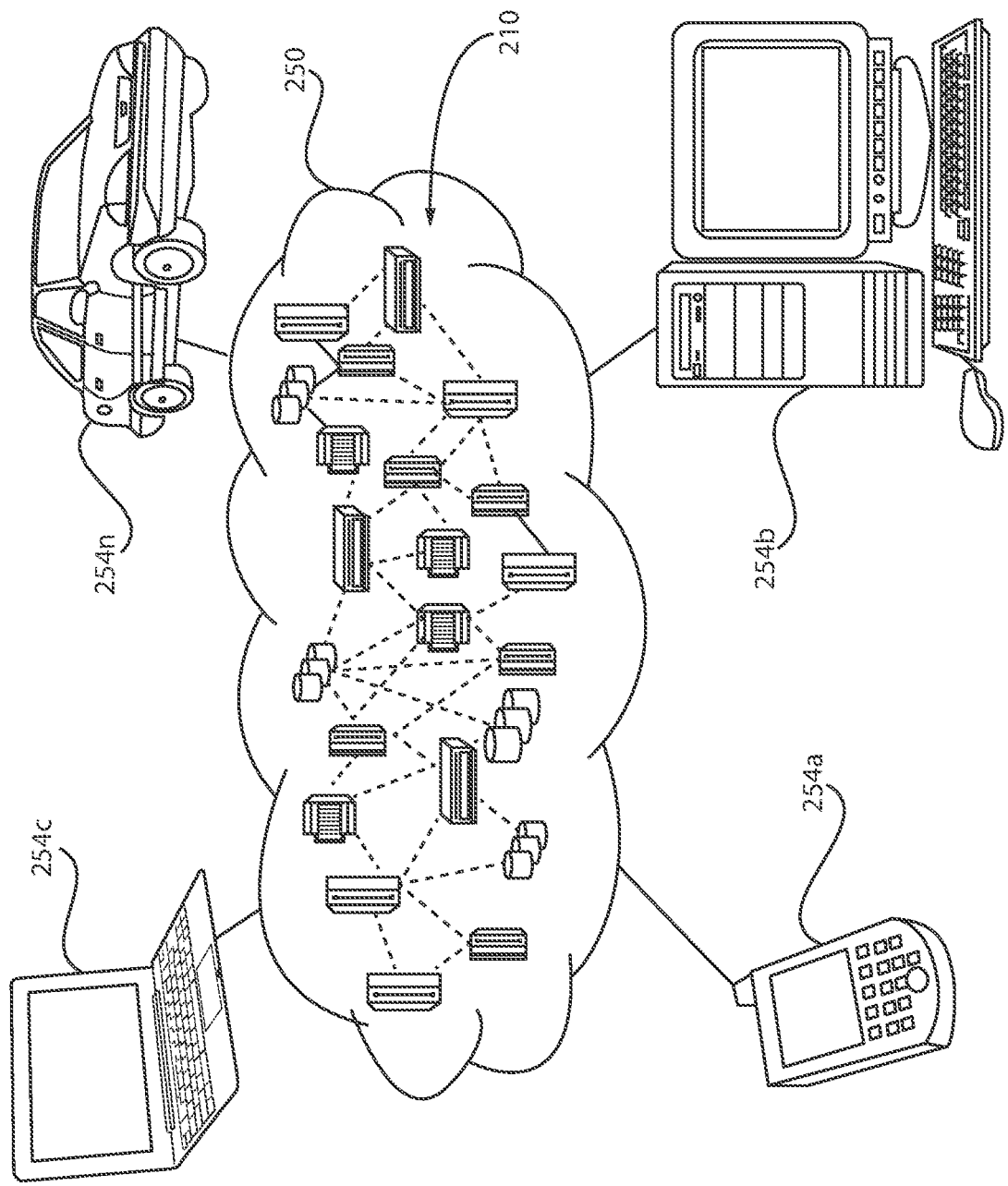
FIG. 2 is a block/flow diagram of an exemplary cloud computing environment, in accordance with an embodiment of the present invention.

FIG. 2 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 250 is depicted for enabling use cases of the present invention. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N can communicate. Nodes 210 can communicate with one another. They can be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
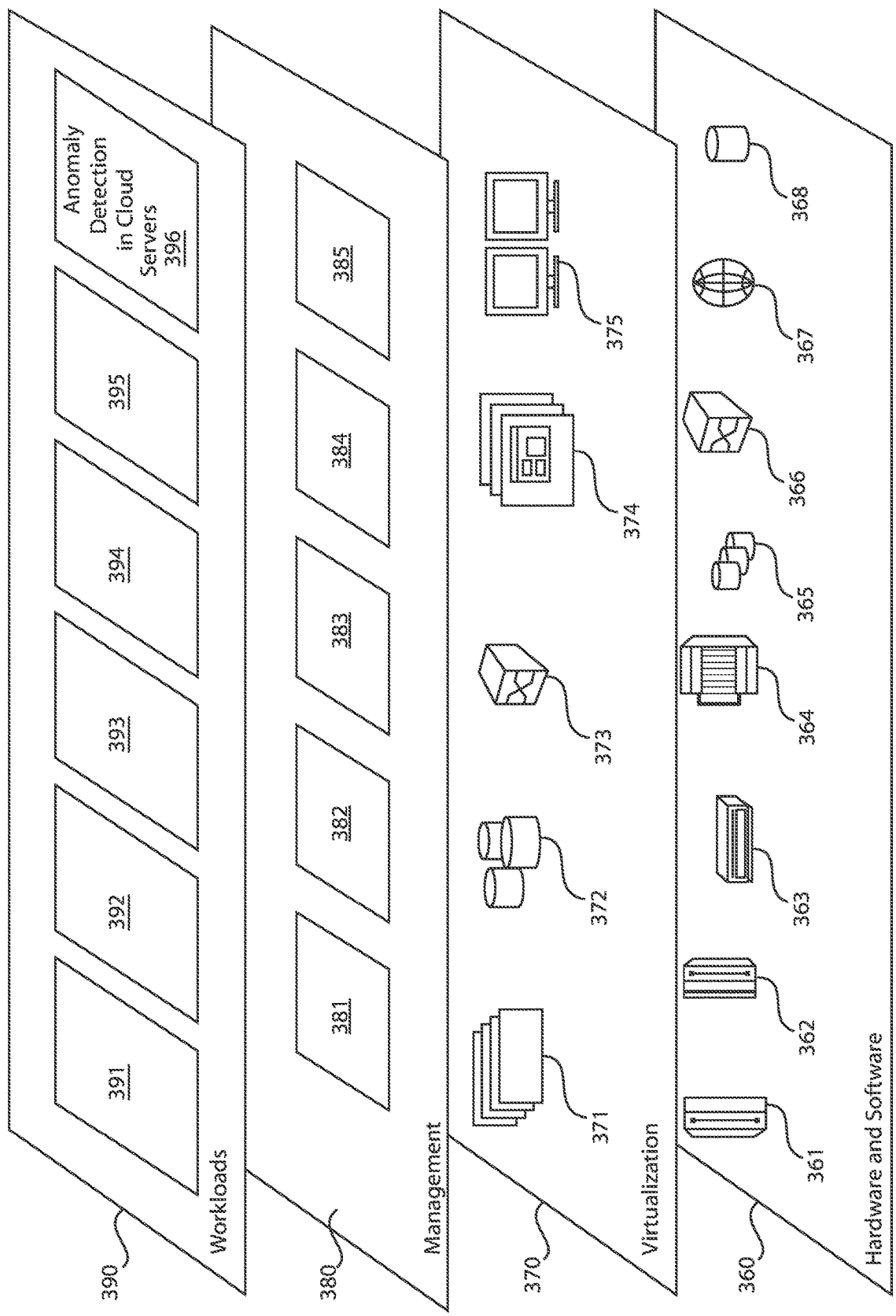
FIG. 3 is a schematic diagram of exemplary abstraction model layers, in accordance with an embodiment of the present invention.

FIG. 3 is a schematic diagram of exemplary abstraction model layers, in accordance with an embodiment of the present invention. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities can be provided: virtual servers 371; virtual storage 372; virtual networks 373, including virtual private networks; virtual applications and operating systems 374; and virtual clients 375.

In one example, management layer 380 can provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment can be utilized. Examples of workloads and functions which can be provided from this layer include: mapping and navigation 391; software development and lifecycle management 392; virtual classroom education delivery 393; data analytics processing 394; transaction processing 395; and a metric-based anomaly detection system 396 in cloud servers.

Figure 4:
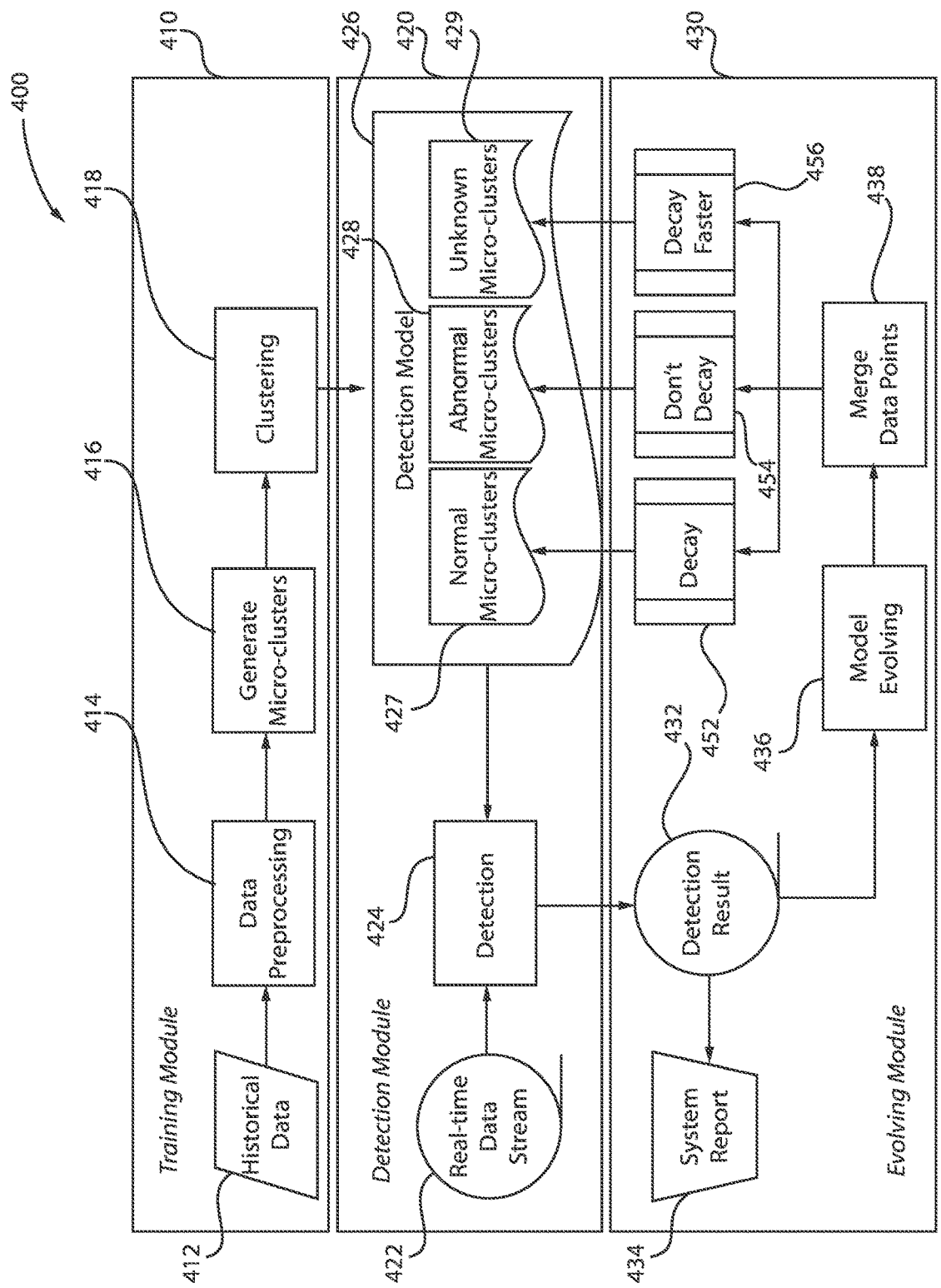
FIG. 4 is a block/flow diagram of an example system architecture in large-scale cloud to detect anomalies and employ an evolving model, in accordance with an embodiment of the present invention.

FIG. 4 is a block/flow diagram of an example system architecture in large-scale cloud to detect anomalies and employ an evolving model, in accordance with an embodiment of the present invention.

In conventional systems, most of the anomaly detection algorithms have been designed for "static" datasets, in which all the observations are available at one time. In non-stationary environments on the other hand, the same algorithms cannot be applied as the underlying data distributions change constantly and the same models are not valid. Hence, the exemplary embodiments of the present invention introduce adaptive models that take into account the dynamically changing characteristics of environments and detect anomalies in evolving data.

Anomalies are data points that are inconsistent with the distribution of the majority of data points. Anomalies are also known as rare events, abnormalities, deviants or outliers.

The availability of data that is used for the task of anomaly detection varies based on the properties of the dataset. In a static dataset, the whole observations of objects are available and the anomalies are detected with regards to the whole dataset.

On the other hand, all the observations may not be available at once and instances can arrive sequentially. The observations in the latter group are called data streams and they can be represented as a dynamic vector. In addition, objects can possess causal/non-causal relationships such as friendship, citation and communication links. This type of relational dataset can be represented as a graph. Similar to data streams, all the observations of objects (nodes in a graph) may not be available at once and they can arrive sequentially. Moreover, the relationships (edges between nodes in a graph) can change over time. This type of relational dataset is represented in an evolving graph.

A data stream is a sequence of data points with at least three main characteristics. A data stream has a continuous flow. Thus, the processing time of the algorithm is a challenge. In addition, the volume of data delivered by a stream continually increases. In other words, the number of incoming data points is unbounded. Therefore, memory storage is another challenge. Finally, data streams can change over time. In order to handle such data streams, data clustering techniques are employed.

Clustering data streams involves employing clustering algorithms that can be used to find anomalies in data streams. Clustering algorithms can be categorized into two groups, one group of techniques are proposed in which the anomalies are assumed to fall into the clusters with small number of data points or low density, and in the second group of clustering based methods, the distance of data points to their nearest cluster centroids are used to detect anomalies.

Cluster processing employs metrics reported by the devices or hosts to identify devices or hosts that are malfunctioning or abnormal. Abnormal devices or host are identifiable when cluster processing is performed as compared to a baseline cluster model, where little or no malfunctioning is experienced by the devices. After the devices or hosts that are abnormal or that experience malfunctions are identified, the devices or hosts can be corrected and the computational resource provider can ensure that the computational resources provided to the subscribers can continue uninterrupted. The exemplary embodiments of the present invention introduce a novel clustering system and method for handling abnormalities.

The system architecture 400 includes a training module 410, a detection module 420, and an evolving module 430.

The training module 410 includes a historical data storage unit or database 412, a data preprocessing module 414, a micro-cluster generation module 416, and a clustering module 418.

The training module 410 is a two-level clustering training module that is configured to localize states of servers and accelerate the detection process. The training module 410 generates micro-clusters from original data points and then clusters the generated micro-clusters into clusters, which represent server states.

Therefore, the training module 410, generates micro-clusters from original data points with labels based on a distance between two points, determines whether normal micro-clusters and abnormal micro-clusters have overlaps, and clusters the generated micro-clusters by employing, e.g., a density-based clustering approach (DBSCAN)-like algorithm. This algorithm can be applicable in noisy datasets and can aid in building normal micro-clusters and outlier micro-clusters. DBSCAN is a density-based clustering algorithm, where given a set of points in some space, the algorithm groups together points that are closely packed together (points with many nearby neighbors), marking as outliers points that lie alone in low-density regions (whose nearest neighbors are too far away).

The detection module 420 is a fast detection module to detect incoming data points.

The detection module 420 detects a data stream 422 by a detecting module 424. The detecting module also receives data from a detection model 426 including normal micro-clusters 427, abnormal micro-clusters 428, and unknown micro-clusters 429.

In particular, if the incoming points merge into an abnormal micro-cluster, the exemplary system of the present invention can send a notification or warning to the administrator directly. Thus, notifications or warning can be sent continuously, and in real-time, to users when certain events occur, such as, e.g., generation of abnormal micro-clusters. Moreover, outliers are merged in unknown micro-clusters and long-term existing unknown micro-clusters will transform to default abnormal micro-clusters.

Therefore, the detection module 420 attempts to merge current data points into exist micro-clusters. If the data points can be merged into a normal micro-cluster, a corresponding positive label is returned. If the data points can be merged into an abnormal micro-cluster, a corresponding negative label is returned with an anomaly message. If the data points correspond to an outlier, temporarily save such data points in memory and return zero. Once these outliers can generate a new cluster, transform the micro-cluster into an abnormal micro-cluster and return a new negative label.

The evolving module 430 is a differentiated micro-cluster evolving module to keep the model up-to-date.

The evolving module 430 receives the detection results 432 which are provided to one or more users or administrators via a system report 434. The detection results 432 are further provided to the model evolving module 436 and the data points are merged in the data merging module 438. The data merging module 438 then processes the data points via different evolving strategies. The normal data points decay (component 452), the abnormal data points don't decay (component 454), and the unknown points decay faster (component 456).

The micro-clusters are divided into three categories, normal, abnormal and unknown. Each of the three kinds of micro-clusters have different evolving strategies to make the model strong and effective. Moreover, interfaces can be provided for administrators to change the category of micro-cluster and add corresponding warning messages.

Therefore, according to the evolving module 430, normal micro-clusters will decay through time, which means if there is no new added points merged into those micro-clusters, the micro-clusters will disappear. The abnormal micro-clusters won't decay through time and such micro-clusters can only be removed manually. The unknown micro-clusters will decay through time more quickly than normal micro-clusters, but once there are enough unknown micro-clusters that can be clustered into a cluster, these micro-clusters will become abnormal micro-clusters.

As a result, in accordance with the training module 410, the detection module 420, and the evolving module 430, the clustering results can be divided into three categories. The first category includes normal points, where normal points are previous occurred normal states, represented by a positive number. The second category includes abnormal points, where abnormal points are previous occurred abnormal states, represented by a negative number. The third category is unknown points, where such unknown points are represented as zero. Then, micro-clusters are employed to accelerate calculations. This occurs by employing micro-clusters to represent a set of close points, and then use micro-clusters for further computation. Only normal and abnormal points will be evolved into the model immediately, but unknown points will be saved in memory temporarily to determine whether it's a noisy point. After the micro-clusters are generated, the micro-clusters are clustered into clusters, which can represent which state those points in.

Figure 5:
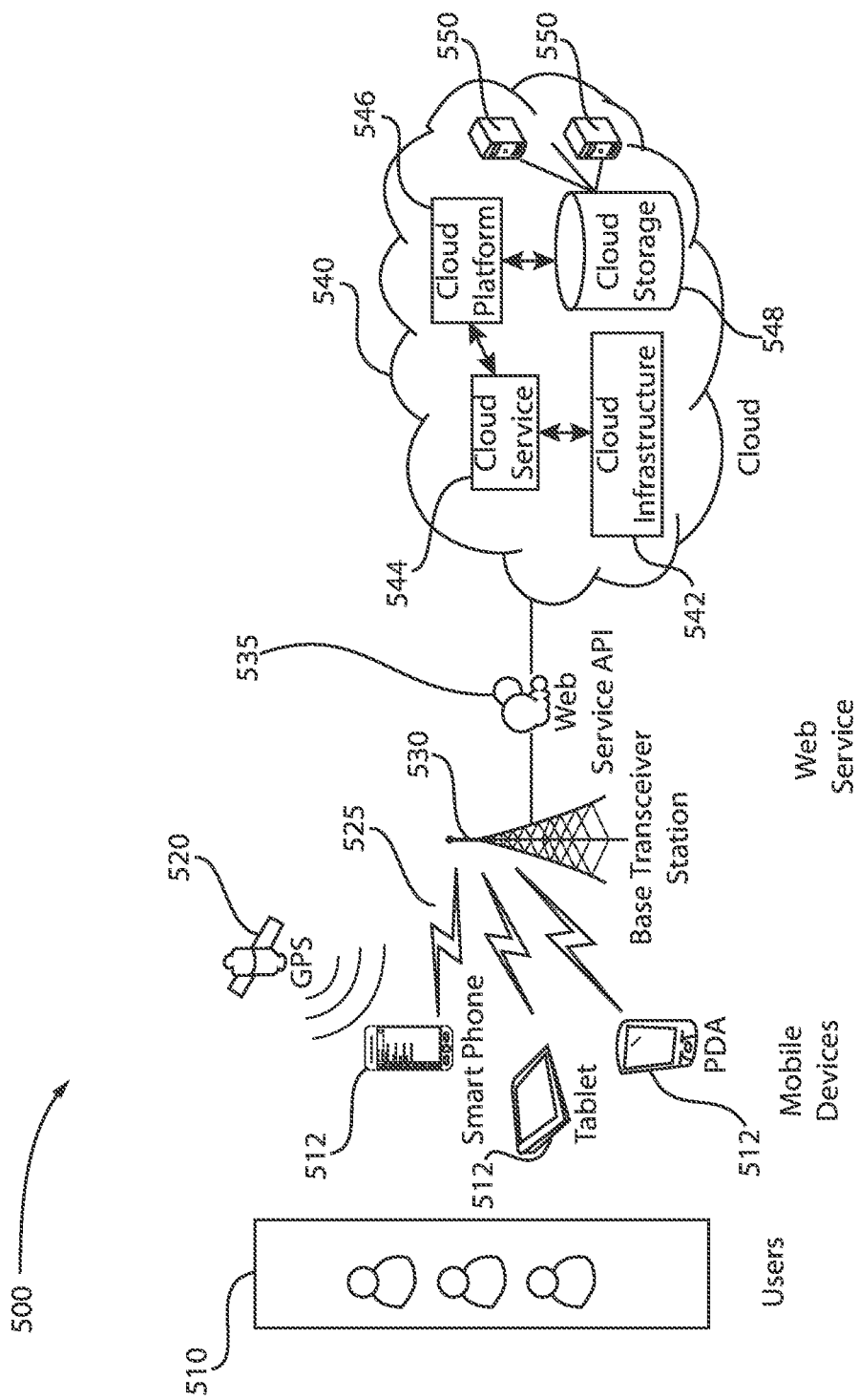
FIG. 5 is a block/flow diagram of an example cloud computing architecture where anomalies can be detected, in accordance with an embodiment of the present invention.

FIG. 5 is a block/flow diagram of an example cloud computing architecture 500 where anomalies can be detected, in accordance with an embodiment of the present invention.

In one embodiment, at least some of client computers 512 can operate over one or more wired and/or wireless networks, can be handled by users 510, and can received information via global position system (GPS) 520 components. Generally, client computers 512 can include virtually any computer capable of communicating over a network to send and receive information, perform various online activities, offline actions, or the like. In one embodiment, one or more of client computers 512 can be configured to operate within a business or other entity to perform a variety of services for the business or other entity. For example, client computers 512 can be configured to operate as a web server, firewall, client application, media player, mobile telephone, game console, desktop computer, or the like. However, client computers 512 are not constrained to these services and can also be employed, for example, as for end-user computing in other embodiments. It should be recognized that more or less client computers can be included within a system such as described herein, and embodiments are therefore not constrained by the number or type of client computers employed.

Computers that can operate as client computer 512 can include computers that connect using a wired or wireless communications medium such as personal computers, multiprocessor systems, microprocessor-based or programmable electronic devices, network PCs, or the like. In some embodiments, client computers 512 can include virtually any portable computer capable of connecting to another computer and receiving information such as, laptop computer, mobile computer, tablet computers, or the like. However, portable computers are not so limited and can also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 512 usually range widely in terms of capabilities and features. Moreover, client computers 512 can access various computing applications, including a browser, or other web-based application.

A web-enabled client computer can include a browser application that is configured to send requests and receive responses over the web. The browser application can be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer can employ the browser application to perform various activities over a network (online). However, another application can also be used to perform various online activities.

Client computers 512 also can include at least one other client application that is configured to receive and/or send content between another computer. The client application can include a capability to send and/or receive content, or the like. The client application can further provide information that identifies itself, including a type, capability, name, and the like. In one embodiment, client computers 512 can uniquely identify themselves through any of a variety of mechanisms, including an Internet Protocol (IP) address, a phone number, Mobile Identification Number (MIN), an electronic serial number (ESN), a client certificate, or other device identifier. Such information can be provided in one or more network packets, or the like, sent between other client computers, application server computer, application server computer, network monitoring computer, or other computers.

Client computers 512 can further be configured to include a client application that enables an end-user to log into an end-user account that can be managed by another computer, such as application server computer, application server computer, network monitoring computer, or the like. Such an end-user account, in one non-limiting example, can be configured to enable the end-user to manage one or more online activities, including in one non-limiting example, project management, software development, system administration, configuration management, search activities, social networking activities, browse various websites, communicate with other users, or the like. Further, client computers can be arranged to enable users to provide configuration information, or the like, to a network monitoring computer. Also, client computers can be arranged to enable users to display reports, interactive user-interfaces, and/or results provided by the network monitor computer.

Wireless network 525 is configured to couple client computers 512 and its components with network 530. Wireless network 525 can include any of a variety of wireless sub-networks that can further overlay stand-alone ad-hoc networks, and the like, to provide an infrastructure-oriented connection for client computers 512. Such sub-networks can include mesh networks, Wireless LAN (WLAN) networks, cellular networks, and the like. In one embodiment, the system can include more than one wireless network.

Wireless network 525 can further include an autonomous system of terminals, gateways, routers, and the like connected by wireless radio links, and the like. These connectors can be configured to move freely and randomly and organize themselves arbitrarily, such that the topology of wireless network 525 can change rapidly.

Wireless network 525 can further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks can enable wide area coverage for mobile computers, such as client computers 512 with various degrees of mobility. In one non-limiting example, wireless network 525 can enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 525 can include virtually any wireless communication mechanism (e.g., Web Service application program interface (API) 535)) by which information can travel between client computers 512 and another computer, network, a cloud-based network 540, a cloud instance, or the like.

A cloud-based network 540 can include, e.g., a cloud platform 546 communicating with a cloud infrastructure 542 via cloud service 544. The cloud platform 546 can store data in a cloud storage 548, which is in communication with cloud servers 550.

Cloud computing, often referred to as simply "the cloud," is the delivery of on-demand computing resources, everything from applications to data centers, over the internet on a pay-for-use basis.

Cloud-based applications, or software as a service, run on distant computers "in the cloud" that are owned and operated by others and that connect to users' computers via the Internet and, usually, a web browser.

Platform 546 as a service provides a cloud-based environment with everything needed to support the complete lifecycle of building and delivering web-based (cloud) applications without the cost and complexity of buying and managing the underlying hardware, software, provisioning, and hosting.

Infrastructure 542 as a service provides companies with computing resources including servers, networking, storage, and data center space on a pay-per-use basis.

Cloud service providers 544 can offer free, personal and/or business accounts providing hundreds or more of gigabytes of online storage. Cloud service providers 544 usually provide many distributed storage resources acting as one, provide high fault tolerance via redundancy and/or distribution of data and provide high durability through the creation of versioned copies.

Cloud storage 548, 550 is a cloud computing model that stores data on the Internet through a cloud computing provider who manages and operates data storage as a service. Cloud storage 548, 550 is delivered on demand with just-in-time capacity and costs, and eliminates buying and managing your own data storage infrastructure.

In a narrow sense, cloud computing refers to a delivery and usage mode of an information technology (IT) infrastructure, that is, obtaining resources using a network in an on-demand and ease-of-scalability manner; and a network providing resources is called "cloud." In the view of a user, resources in the "cloud" can be infinitely extended, and can be acquired at any time, extended at any time, used on-demand, and paid according to usage.

In a broad sense, cloud computing refers to a delivery and usage mode of a service, that is, obtaining a service using a network in an on-demand and ease-of-scalability manner. This service can relate to IT, software, and Internet, and can also be another service, and the network providing the service is called "cloud." The "cloud" is virtual computing resources capable of implementing self-maintenance and self-management, which generally are large server clusters, including a computing server, a storage server, and broad-band resources. Cloud computing implements unified management and scheduling for a large amount of computing resources connected using a network, where the computing resources form a computing resource pool, so as to provide on-demand services for users. In a cloud computing application, cloud computing system 500 integrates computing resources, storage resources, and network resources, and provides the resources for users by means of a network using technologies such as virtualization.

Figure 6:
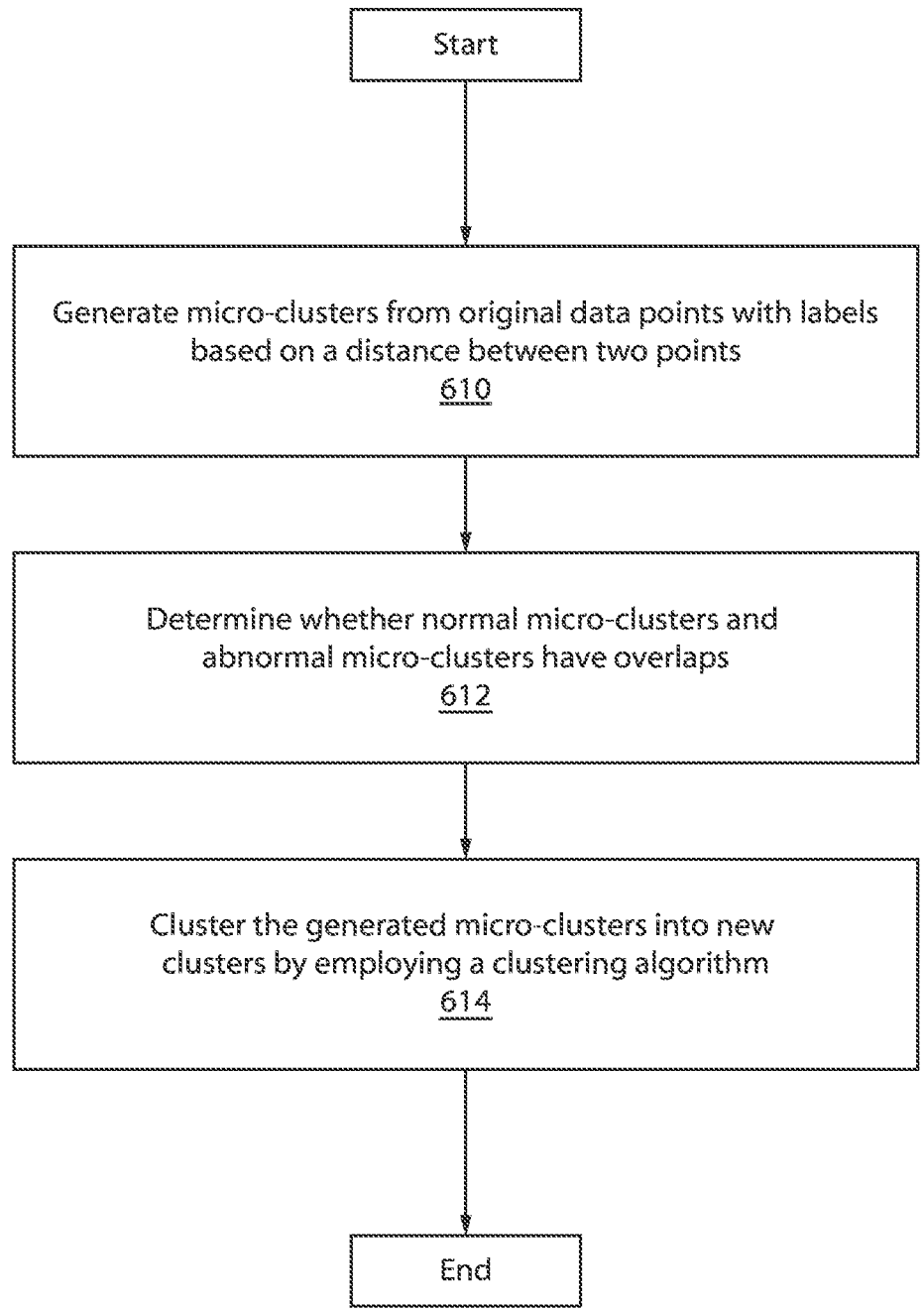
FIG. 6 is a block/flow diagram illustrating an example method for executing a training module, in accordance with an embodiment of the present invention.

FIG. 6 is a block/flow diagram illustrating a method for executing a training module, in accordance with an embodiment of the present invention.

At block 610, generate micro-clusters from original data points with labels based on a distance between two points.

At block 612, determine whether normal micro-clusters and abnormal micro-clusters have or exhibit overlaps.

At block 614, cluster the generated micro-clusters into new clusters by employing, e.g., a clustering algorithm.

Figure 7:
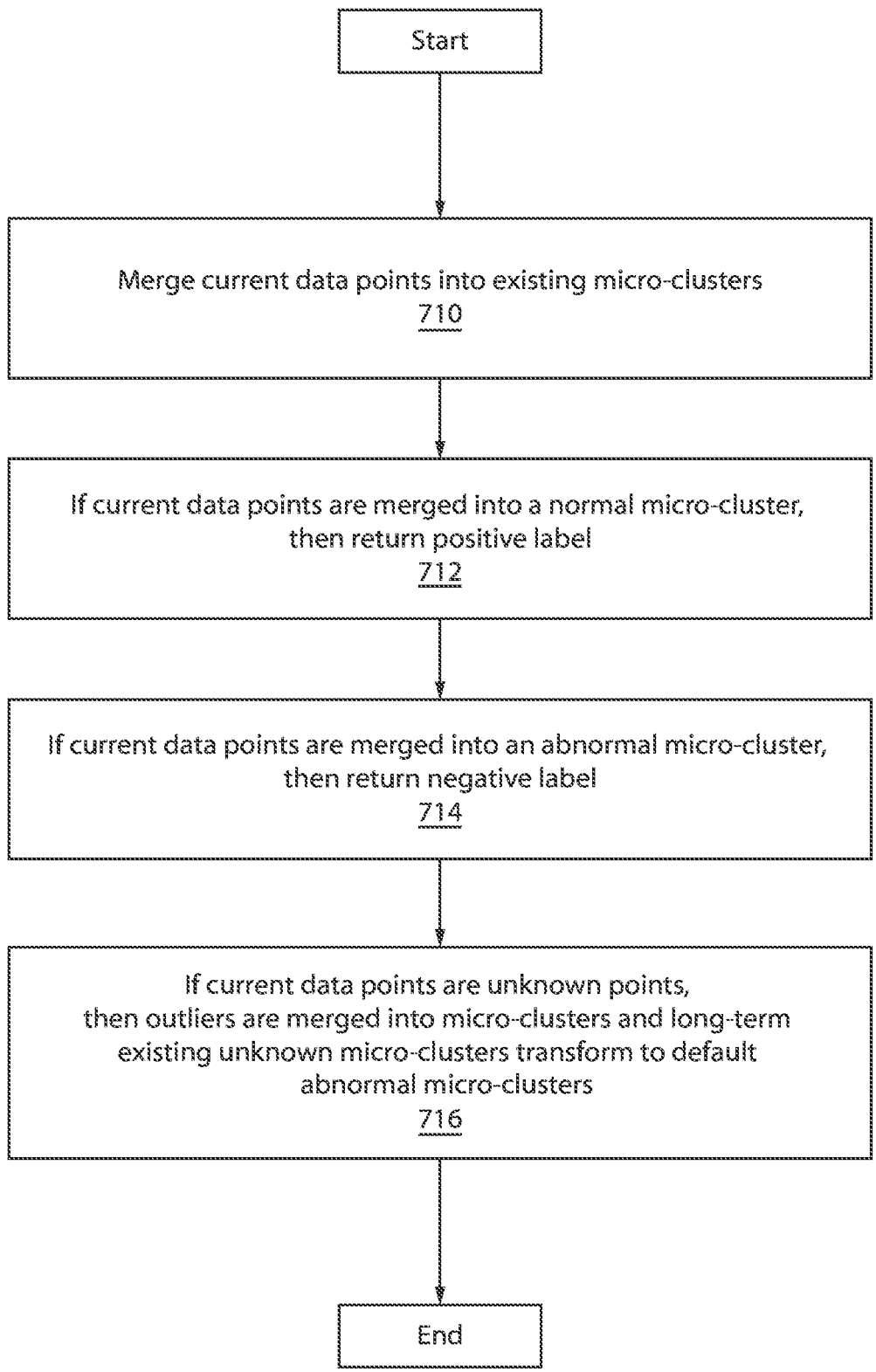
FIG. 7 is a block/flow diagram illustrating an example method for executing a detection module, in accordance with an embodiment of the present invention.

FIG. 7 is a block/flow diagram illustrating a method for executing a detection module, in accordance with an embodiment of the present invention.

At block 710, merge current data points into existing micro-clusters.

At block 712, if current data points are merged into a normal micro-cluster, then return a positive label.

At block 714, if current data points are merged into an abnormal micro-cluster, then return a negative label.

At block 716, if current data points are unknown points, then outliers are merged into unknown micro-clusters and long-term existing unknown micro-clusters transform to default abnormal micro-clusters.

Figure 8:
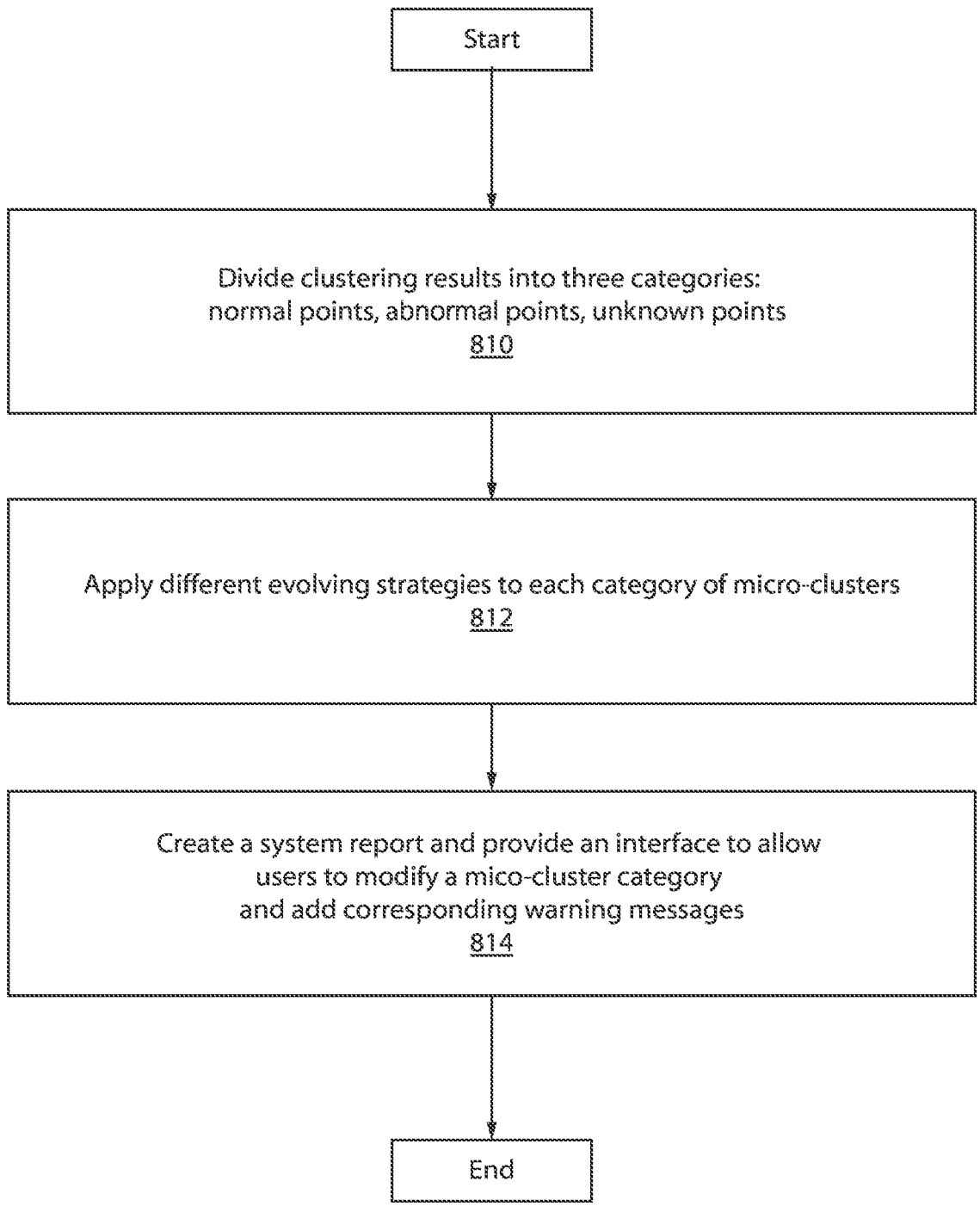
FIG. 8 is a block/flow diagram illustrating an example method for executing an evolving module, in accordance with an embodiment of the present invention.

FIG. 8 is a block/flow diagram illustrating a method for executing an evolving module, in accordance with an embodiment of the present invention.

At block 810, divide clustering results into three categories: normal points, abnormal points, unknown points.

At block 812, apply different evolving strategies to each category of micro-clusters.

At block 814, create a system report and provide an interface to allow users to modify a micro-cluster category and add corresponding warning messages.

Therefore, in summary, the exemplary embodiments of the present invention employ an evolvable detection system in large-scale clouds to detect anomalies and evolve models efficiently, which has three primary modules: (1) A two-level clustering training module to localize states of servers and accelerate detection process. This two-level clustering mechanism makes quick detection possible. (2) A fast detection module to detect the incoming data points. The detection module can do detection very fast and efficient. In addition, there is a transformation mechanism that outliers will be merged in unknown micro-clusters and long-term existing unknown micro-clusters will transform to default abnormal micro-clusters. (3) A differentiated micro-cluster evolving module to keep the model up-to-date. For different kinds of points, different evolving mechanisms can be employed. Also, this module provides interfaces for administrator to change the category of micro-cluster and add corresponding warning messages.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As used herein, the term "session" refers to a semi-permanent interactive packet interchange between two or more communicating endpoints, such as network devices. A session is set up or established at a certain point in time, and torn down at a later point in time. An established communication session can involve more than one message in each direction. A session can have stateful communication where at least one of the communicating network devices saves information about the session history to be able to communicate. A session can also provide stateless communication, where the communication includes independent requests with responses between the endpoints. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection can be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) can deliver packets out of order, since different packets can be routed independently and could be delivered over different paths. Packets associated with a TCP protocol connection can also be routed independently and could be delivered over different paths. However, for TCP connections the network communication system can provide the packets to application endpoints in the correct order.

As used herein, the terms "session flow" and "network flow" refer to one or more network packets or a stream of network packets that are communicated in a session that is established between at least two endpoints, such as two network devices. In at least one of the various embodiments, flows can be useful if one or more of the endpoints of a session can be behind a network traffic management device, such as a firewall, switch, router, load balancer, or the like. In at least one of the various embodiments, such flows can be used to ensure that the packets sent between the endpoints of a flow can be routed appropriately.

As used herein, the terms "network monitor", "network monitoring computer", or "NMC" refer to an application (software, hardware, or some combination) that is arranged to monitor and record flows of packets in a session that are communicated between at least two endpoints over at least one network. The NMC can provide information for assessing different aspects of these monitored flows. In at least one embodiment, the NMC can passively monitor network packet traffic without participating in the communication protocols. This monitoring can be performed for a variety of reasons, including troubleshooting and proactive remediation, end-user experience monitoring, SLA monitoring, capacity planning, application lifecycle management, infrastructure change management, infrastructure optimization, business intelligence, security, and regulatory compliance. The NMC can receive network communication for monitoring through a variety of means including network taps, wireless receivers, port mirrors or directed tunnels from network switches, clients or servers including the endpoints themselves, or other infrastructure devices. In at least some of the various embodiments, the NMC can receive a copy of each packet on a particular network segment or virtual local area network (VLAN).

As used herein, the term "agent" refers to an actor in the monitored network. Agents can include applications, services, programs, processes, network devices, or the like, operating in the monitored network. For example, individual agents can include, web clients, web servers, database clients, database servers, mobile app clients, payment processors, groupware clients, groupware services, or the like. In some cases, multiple agents can co-exist on the same network computer, process, application, or cloud compute instance.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a system and method for detecting anomalies in dynamic datasets (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method executed on a processor for detecting anomalies in dynamic datasets generated in a cloud computing environment, the computer-implemented method comprising:
  employing a two-level clustering training module to generate micro-clusters from a plurality of data points collected from cloud servers, each of the micro-clusters representing a set of original data from the plurality of data points, and each of the micro-clusters is inspected to determine whether overlap exists among them;
  detecting normal data points, abnormal data points, and unknown data points from the plurality of data points via a detection model;
  evolving the detection model by a plurality of different evolving mechanisms; and
  generating a system report displayed on a user interface, the system report summarizing the micro-cluster information.

2. The computer-implemented method of claim 1, wherein the plurality of different evolving mechanisms include an evolving mechanism for each of the normal, abnormal, and unknown data points.

3. The computer-implemented method of claim 2, wherein the normal points and the abnormal points are immediately evolved in the detection model and the unknown points are temporarily saved in a memory.

4. The computer-implemented method of claim 1, wherein the two-level clustering training module is trained with historical data stored in a historical information database.

5. The computer-implemented method of claim 1, wherein the generated micro-clusters are normal micro-clusters, abnormal micro-clusters, and unknown micro-clusters.

6. The computer-implemented method of claim 5, wherein the normal micro-clusters decay through time, the abnormal micro-clusters do not decay through time, and the unknown micro-clusters decay through time at a quicker rate than the normal micro-clusters.

7. The computer-implemented method of claim 5, wherein long-term unknown micro-clusters are transformed to default abnormal micro-clusters.

8. The computer-implemented method of claim 5, wherein the micro-cluster information is permitted to be modified by a user, and, when the abnormal micro-clusters are generated, the user receives a notification.

9. A non-transitory computer-readable storage medium comprising a computer-readable program executed on a processor in a data processing system for detecting anomalies in dynamic datasets generated in a cloud computing environment, wherein the computer-readable program when executed on the processor causes a computer to perform the steps of:
  employing a two-level clustering training module to generate micro-clusters from a plurality of data points collected from cloud servers, each of the micro-clusters representing a set of original data from the plurality of data points, and each of the micro-clusters is inspected to determine whether overlap exists among them;
  detecting normal data points, abnormal data points, and unknown data points from the plurality of data points via a detection model;
  evolving the detection model by a plurality of different evolving mechanisms; and
  generating a system report displayed on a user interface, the system report summarizing the micro-cluster information.

10. The non-transitory computer-readable storage medium of claim 9, wherein the plurality of different evolving mechanisms include an evolving mechanism for each of the normal, abnormal, and unknown data points.

11. The non-transitory computer-readable storage medium of claim 10, wherein the normal points and the abnormal points are immediately evolved in the detection model and the unknown points are temporarily saved in a memory.

12. The non-transitory computer-readable storage medium of claim 9, wherein the two-level clustering training module is trained with historical data stored in a historical information database.

13. The non-transitory computer-readable storage medium of claim 9, wherein the generated micro-clusters are normal micro-clusters, abnormal micro-clusters, and unknown micro-clusters.

14. The non-transitory computer-readable storage medium of claim 13, wherein the normal micro-clusters decay through time, the abnormal micro-clusters do not decay through time, and the unknown micro-clusters decay through time at a quicker rate than the normal micro-clusters.

15. The non-transitory computer-readable storage medium of claim 13, wherein long-term unknown micro-clusters are transformed to default abnormal micro-clusters.

16. The non-transitory computer-readable storage medium of claim 13, wherein the micro-cluster information is permitted to be modified by a user, and, when the abnormal micro-clusters are generated, the user receives a notification.

17. A system for detecting anomalies in dynamic datasets generated in a cloud computing environment, the system comprising:
a two-level clustering training component generates micro-clusters from a plurality of data points received from a plurality of cloud servers, each of the micro-clusters representing a set of original data from the plurality of data points, and each of the micro-clusters is inspected to determine whether overlap exists among them;
a detector detects normal data points, abnormal data points, and unknown data points from the plurality of data points via a detection model; and
a system report generated to be displayed on a user interface, the system report summarizing the micro-cluster information,
wherein normal micro-clusters of the generated micro-clusters decay through time and abnormal micro-clusters of the generated micro-clusters do not decay through time.

18. The system of claim 17, wherein an evolving component uses a different evolving mechanism for each of the normal, abnormal, and unknown data points to evolve the detection model.

19. The system of claim 17, wherein the two-level clustering training module is trained with historical data stored in a historical information database.

20. The system of claim 17,
wherein unknown micro-clusters of the generated micro-clusters decay through time at a quicker rate than the normal micro-clusters.

* * * * *